United States Patent
Akabayashi et al.

(10) Patent No.: US 11,807,197 B2
(45) Date of Patent: Nov. 7, 2023

(54) WIPER ARM

(71) Applicants: MITSUBA Corporation, Gunma (JP); TADA JAPAN CO., LTD., Hiroshima (JP)

(72) Inventors: Shinri Akabayashi, Gunma (JP); Kentaroh Tada, Hiroshima (JP)

(73) Assignees: MITSUBA Corporation, Gunma (JP); TADA JAPAN CO., LTD., Hiroshima (JP)

( * ) Notice: Subject to any disclaimer, the term of this patent is extended or adjusted under 35 U.S.C. 154(b) by 123 days.

(21) Appl. No.: 17/429,630

(22) PCT Filed: Jul. 27, 2020

(86) PCT No.: PCT/JP2020/028644
§ 371 (c)(1),
(2) Date: Aug. 10, 2021

(87) PCT Pub. No.: WO2021/020327
PCT Pub. Date: Feb. 4, 2021

(65) Prior Publication Data
US 2022/0105904 A1 Apr. 7, 2022

(30) Foreign Application Priority Data
Jul. 30, 2019 (JP) .................. 2019-139721

(51) Int. Cl.
*B60S 1/52* (2006.01)
*B05B 1/30* (2006.01)
(Continued)

(52) U.S. Cl.
CPC ............ *B60S 1/522* (2013.01); *B05B 1/3006* (2013.01); *B05B 3/14* (2013.01); *B60S 1/3415* (2013.01)

(58) Field of Classification Search
CPC ............................. B60S 1/522; B60S 1/3415
See application file for complete search history.

(56) References Cited

U.S. PATENT DOCUMENTS 6,393,652 B1    5/2002   Vogt
10,106,130 B2 * 10/2018  Barret .................... B60S 1/522
(Continued)

FOREIGN PATENT DOCUMENTS

JP      S6194464      6/1986
JP      2007030565    2/2007
(Continued)

OTHER PUBLICATIONS

"Written Opinion of the International Searching Authority (Form PCT/ISA/237) of PCT/JP2020/028644," dated Oct 6, 2020, with English translation thereof, pp. 1-6.
(Continued)

*Primary Examiner* — Andrew A Horton
(74) *Attorney, Agent, or Firm* — JCIPRNET

(57) ABSTRACT

A washer nozzle comprises a first flow path that extends in the longitudinal direction of an arm piece, a second flow path that is connected to the downstream side of the first flow path and that extends in a direction intersecting the longitudinal direction of the arm piece, an upstream opening that opens the first flow path and the second flow path toward one side in the longitudinal direction of the arm piece, and a blocking member that is provided with a joint part connected by a washer tube and that blocks the upstream opening.

3 Claims, 7 Drawing Sheets

(51) Int. Cl.
 B05B 3/14 (2006.01)
 B60S 1/34 (2006.01)

(56) References Cited

U.S. PATENT DOCUMENTS

| | | | |
|---|---|---|---|
| 2013/0152320 A1 | 6/2013 | Matsumoto | |
| 2018/0118171 A1* | 5/2018 | Shimoyama | B60S 1/04 |
| 2018/0272995 A1* | 9/2018 | Sasaki | B60S 1/3415 |
| 2018/0354463 A1* | 12/2018 | Jarasson | B60S 1/3415 |

FOREIGN PATENT DOCUMENTS

| | | |
|---|---|---|
| JP | 2011527964 | 11/2011 |
| JP | 2012158263 | 8/2012 |
| JP | 2014501200 | 1/2014 |
| JP | 2016155420 | 9/2016 |

OTHER PUBLICATIONS

"Search Report of Europe Counterpart Application", dated Aug. 8, 2022, pp. 1-7.

"International Search Report (Form PCT/ISA/210) of PCT/JP2020/028644," dated Oct. 6, 2020, with English translation thereof, pp. 1-4.

* cited by examiner

[Cross section taken along A-A]

[Cross section taken along B-B]

150: Arm piece
160: Washer nozzle
163d: Upstream opening
(Flow path opening)
167: Closing member
167b: Joint part
FP1: First flow path
FP2: Second flow path (a)

[Left-right slide]

(b)

[Up-down slide]

WIPER ARM

CROSS-REFERENCE TO RELATED APPLICATION

This application is a 371 application of the International PCT application serial no. PCT/JP2020/028644, filed on Jul. 27, 2020, which claims the priority benefits of Japan Patent Application No. 2019-139721, filed on Jul. 30, 2019. The entirety of each of the above-mentioned patent applications is hereby incorporated by reference herein and made a part of this specification.

BACKGROUND

Technical Field

The disclosure relates to a wiper arm which swings a wiper blade that wipes a surface to be wiped.

Description of Related Art

A wiper device mounted on a vehicle such as an automobile includes a wiper arm that swings on a surface to be wiped. A wiper blade is mounted on the tip end of the wiper arm, and a swing shaft provided on the vehicle body is mounted on the base end of the wiper arm. As a result, by driving the wiper motor to swing the swing shaft, the wiper blade reciprocally wipes on the surface to be wiped, and the surface to be wiped is wiped cleanly.

For example, in the technique described in Patent Document 1, a connection member (adapter) is connected to the tip end of the wiper arm, and the connection member is provided with a plurality of flow paths for supplying a washer fluid (cleaning fluid) to the flow path (spray channel) provided in the wiper blade. As a result, the washer fluid is supplied to the flow path of the connection member, whereby the washer fluid is supplied to the flow path of the wiper blade. Therefore, the washer fluid is sprayed from a plurality of spraying holes (spray openings) provided in the wiper blade.

Here, the connection member is provided with an upstream flow path to which a washer tube is connected and a downstream flow path parallel to the upstream flow path and connected to the flow path of the wiper blade. Then, a connection flow path (connection channel) extending in a direction orthogonal to these flow paths and connecting these flow paths to each other is provided between these flow paths parallel to each other. As a result, the washer fluid is supplied from the upstream flow path to the downstream flow path via the connection flow path.

RELATED ART

Patent Document

[Patent Document 1] Japanese Laid-Open No. 2014-501200

SUMMARY

Technical Problem

However, in the technique described in Patent Document 1 described above, since it is necessary to provide a connection flow path between the upstream flow path and the downstream flow path so as to be orthogonal thereto, after the connection flow path is formed, it is necessary to mount a lid member (closing ball) on the end of the connection flow path so that the washer fluid would not leak from the connection flow path. Therefore, in addition to the large number of parts, small parts management is required, which causes a problem that the assembly work becomes complicated.

The disclosure provides a wiper arm capable of improving the assembly workability.

Solution to the Problem

In an aspect of the disclosure, a wiper arm which swings a wiper blade that wipes a surface to be wiped includes: an arm head whose base end is mounted on a swing shaft; an arm shank whose base end is mounted on a tip end of the arm head; an arm piece whose base end is mounted on a tip end of the arm shank; a washer tube which is arranged along the arm head, the arm shank and the arm piece; and a washer nozzle which is mounted on the arm piece and which sprays a washer fluid toward the surface to be wiped. The washer nozzle includes: a first flow path which extends in a longitudinal direction of the arm piece; a second flow path which is connected to a downstream side of the first flow path and which extends in a direction intersecting the longitudinal direction of the arm piece; a flow path opening which opens the first flow path and the second flow path toward one side in the longitudinal direction of the arm piece; and a closing member which is provided with a joint part connected with the washer tube and which closes the flow path opening.

In another aspect of the disclosure, the washer nozzle further includes a third flow path which is connected to a downstream side of the second flow path and which extends toward the surface to be wiped.

In another aspect of the disclosure, the washer nozzle further includes a flat plate part inside which the second flow path is provided and which is fixed to the arm piece by a fixing screw.

Effects

According to the disclosure, the washer nozzle includes: a first flow path which extends in a longitudinal direction of an arm piece; a second flow path which is connected to a downstream side of the first flow path and which extends in a direction intersecting the longitudinal direction of the arm piece; a flow path opening which opens the first flow path and the second flow path toward one side in the longitudinal direction of the arm piece; and a closing member which is provided with a joint part connected with a washer tube and which closes the flow path opening.

As a result, both the first flow path and the second flow path, which are in a mutually intersecting relationship, can be opened in the same direction on one side in the longitudinal direction of the arm piece, and thus the first flow path and the second flow path can be molded by using one mold. Further, since the flow path opening can be closed with the relatively large closing member which has the joint part, as compared with the conventional case, small parts management is not required, and thus the assembly workability can be improved.

DESCRIPTION OF THE EMBODIMENTS

Hereinafter, an embodiment of the disclosure will be described in detail with reference to the drawings.

Figure 1:
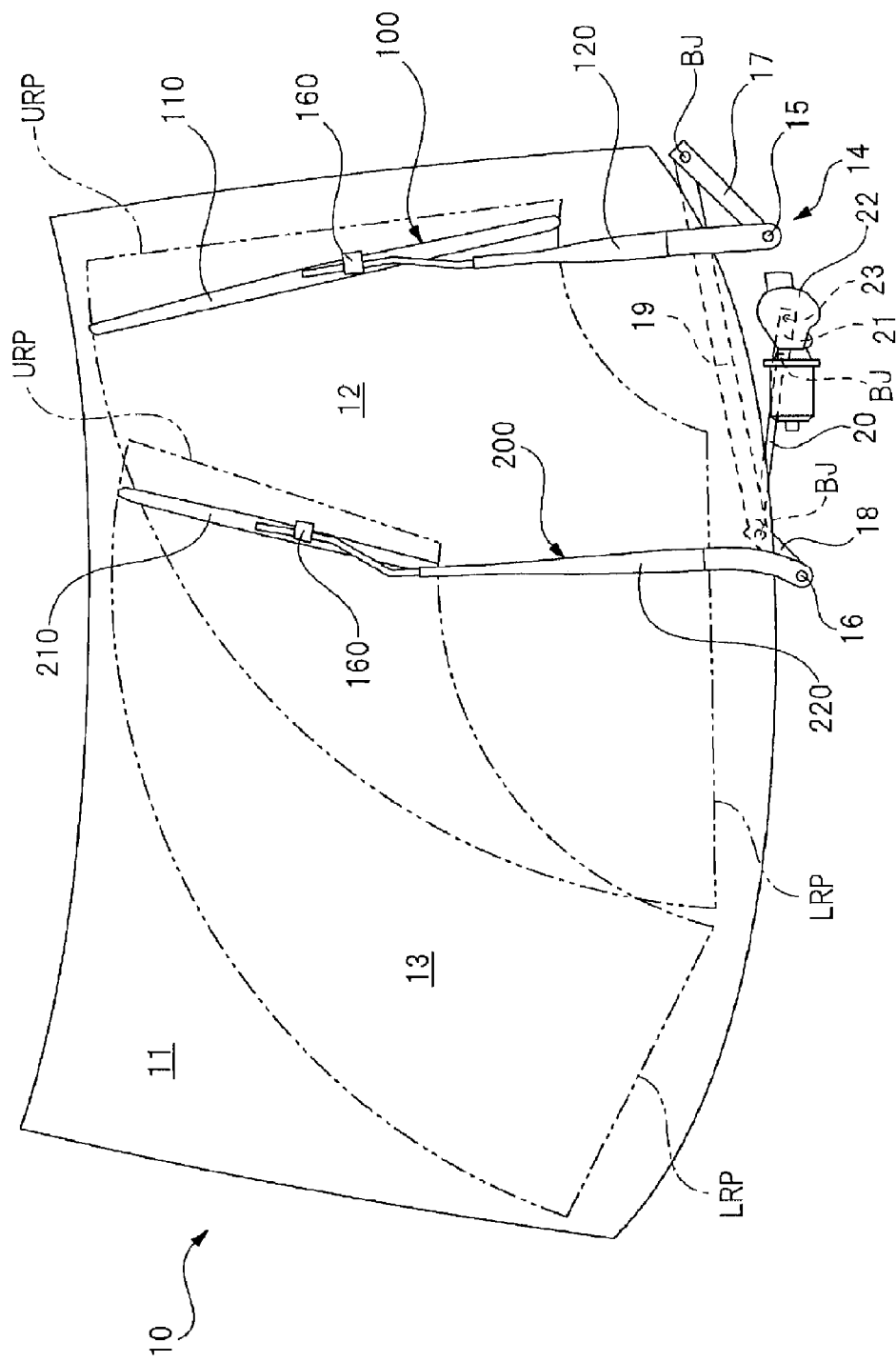
FIG. 1 is a schematic view showing a state in which a wiper device is mounted on a vehicle.
Figure 2:
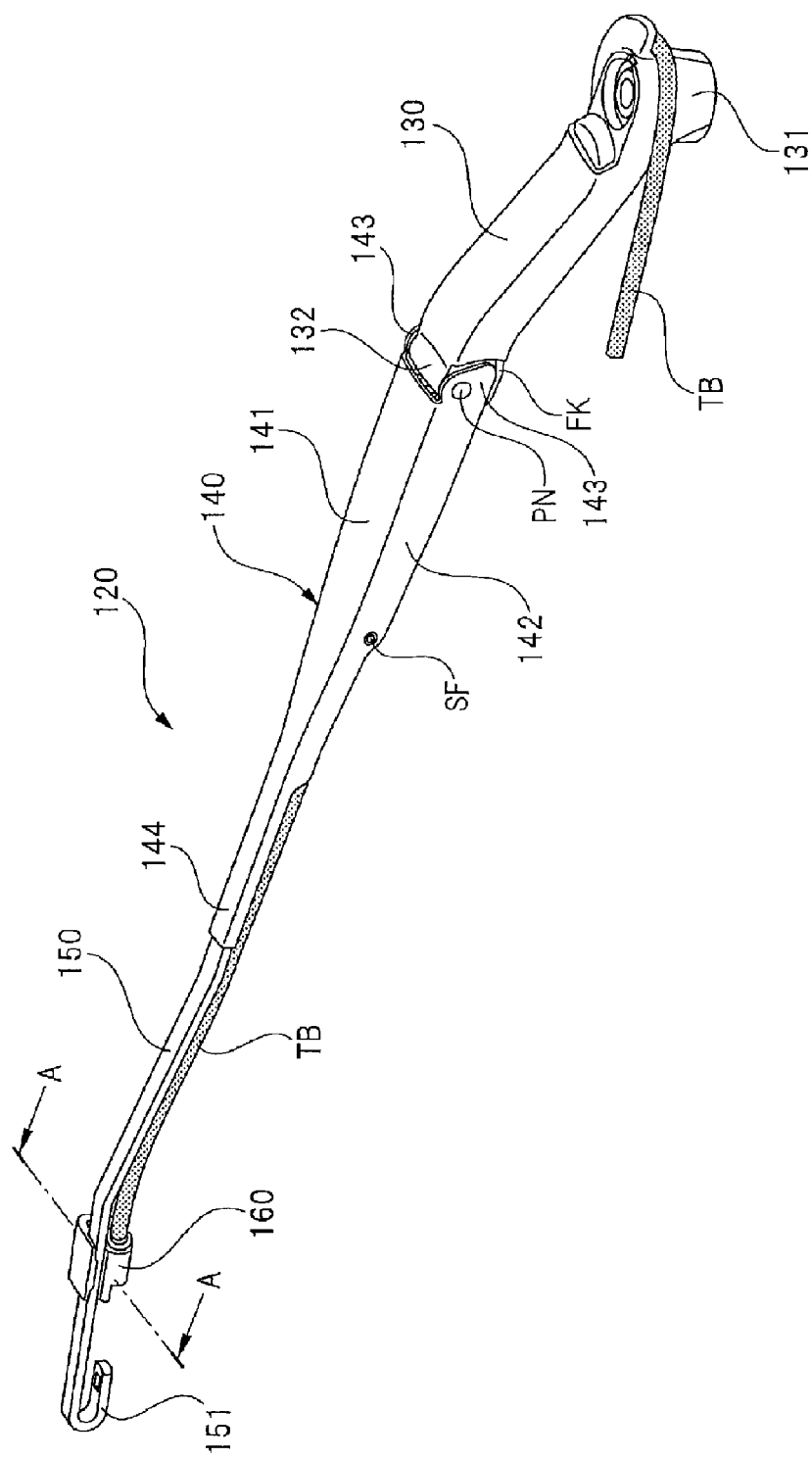
FIG. 2 is a perspective view of a DR side wiper arm as viewed from the front side.
Figure 3:
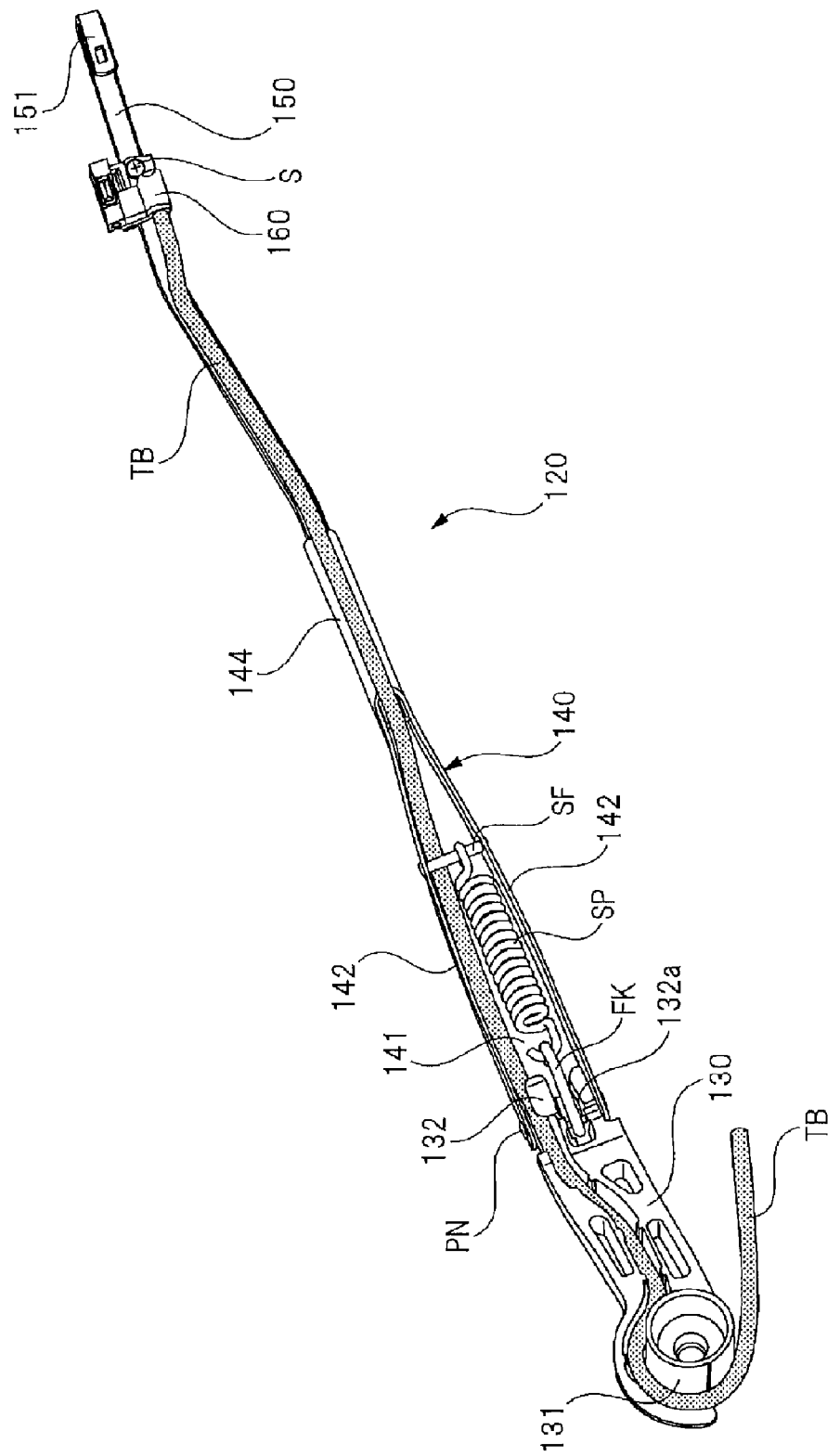
FIG. 3 is a perspective view of the DR side wiper arm as viewed from the back side.
Figure 4:
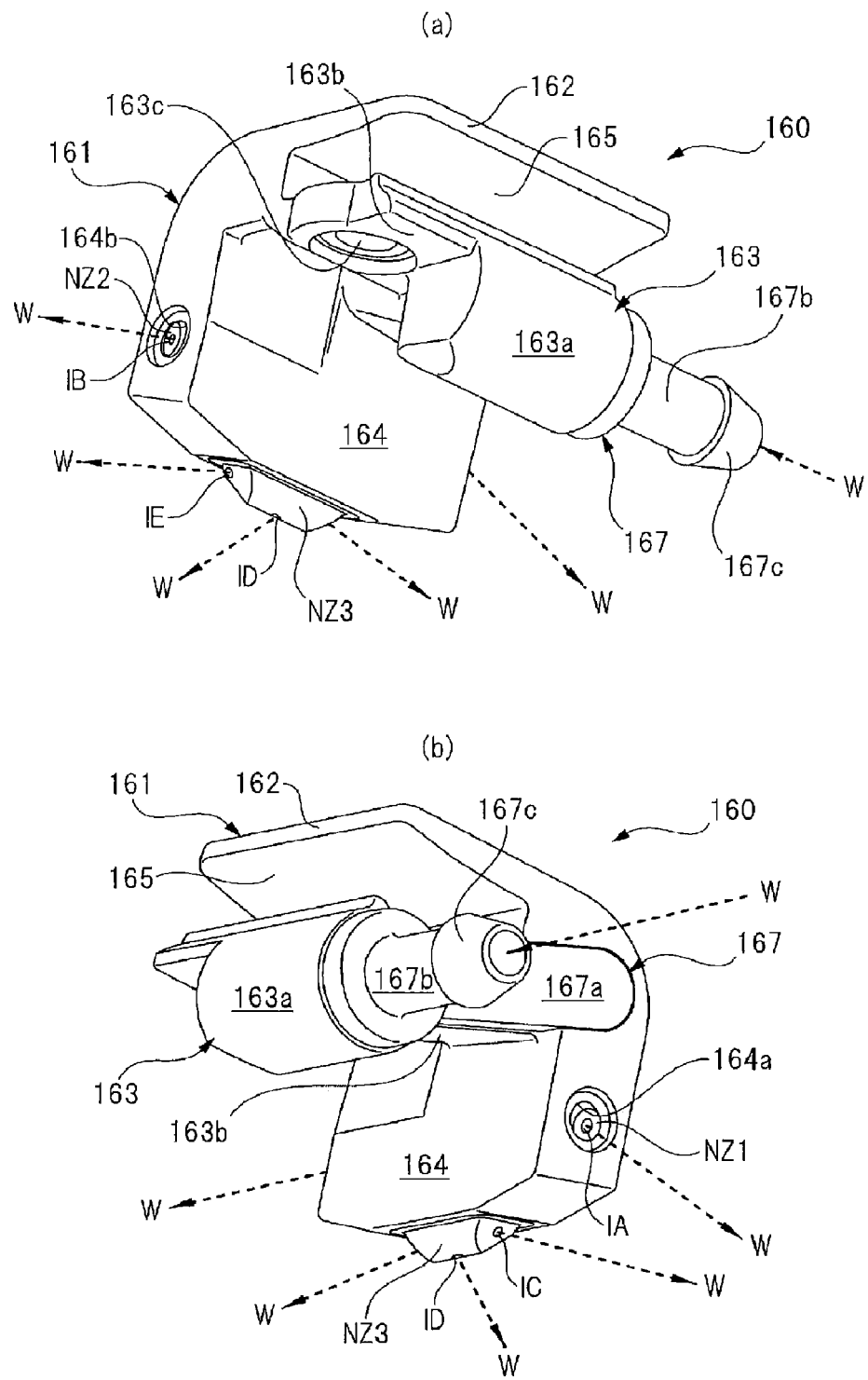
In FIG. 4, (a) and (b) are perspective views showing a washer nozzle.
Figure 5:
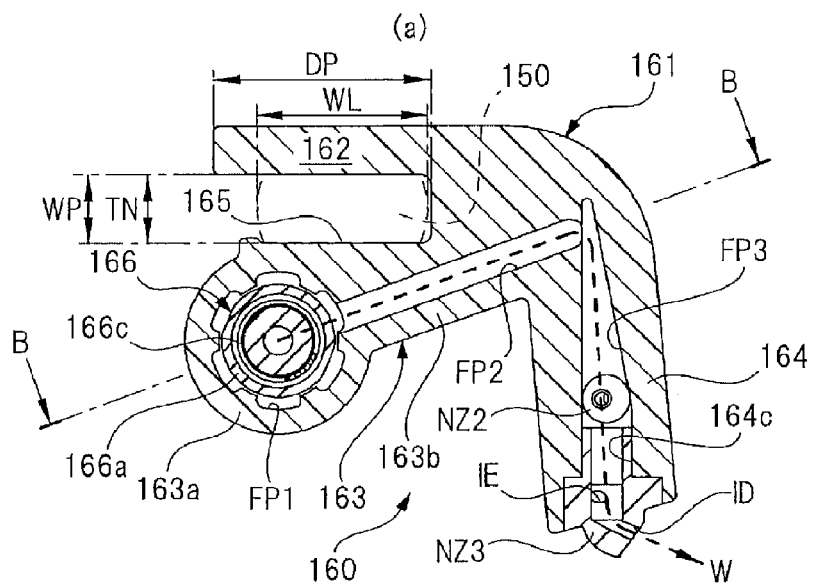
In FIG. 5, (a) is a cross-sectional view taken along the line A-A of FIG. 2, and (b) is a cross-sectional view taken along the line B-B of (a) of FIG. 5.
Figure 5:
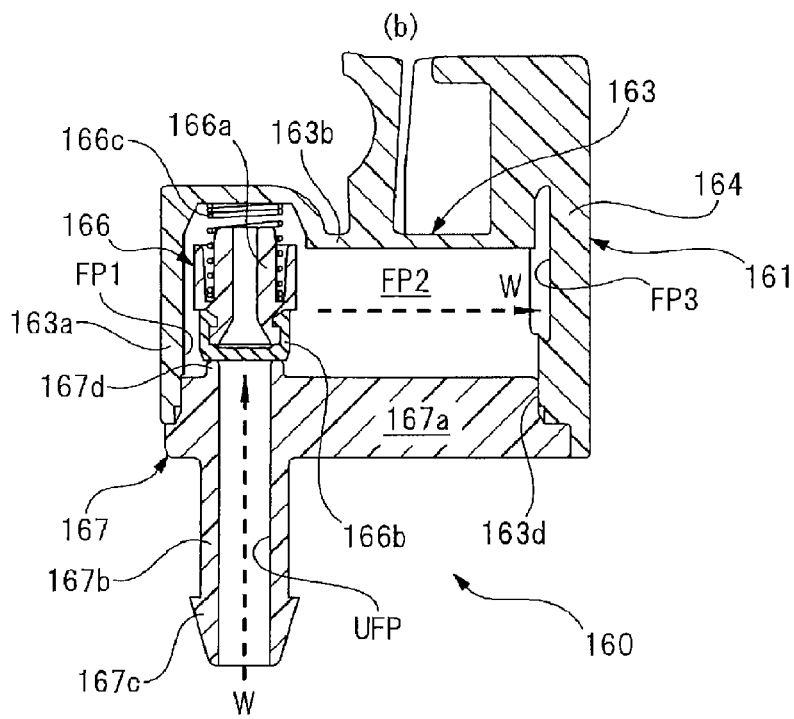
Figure 6:
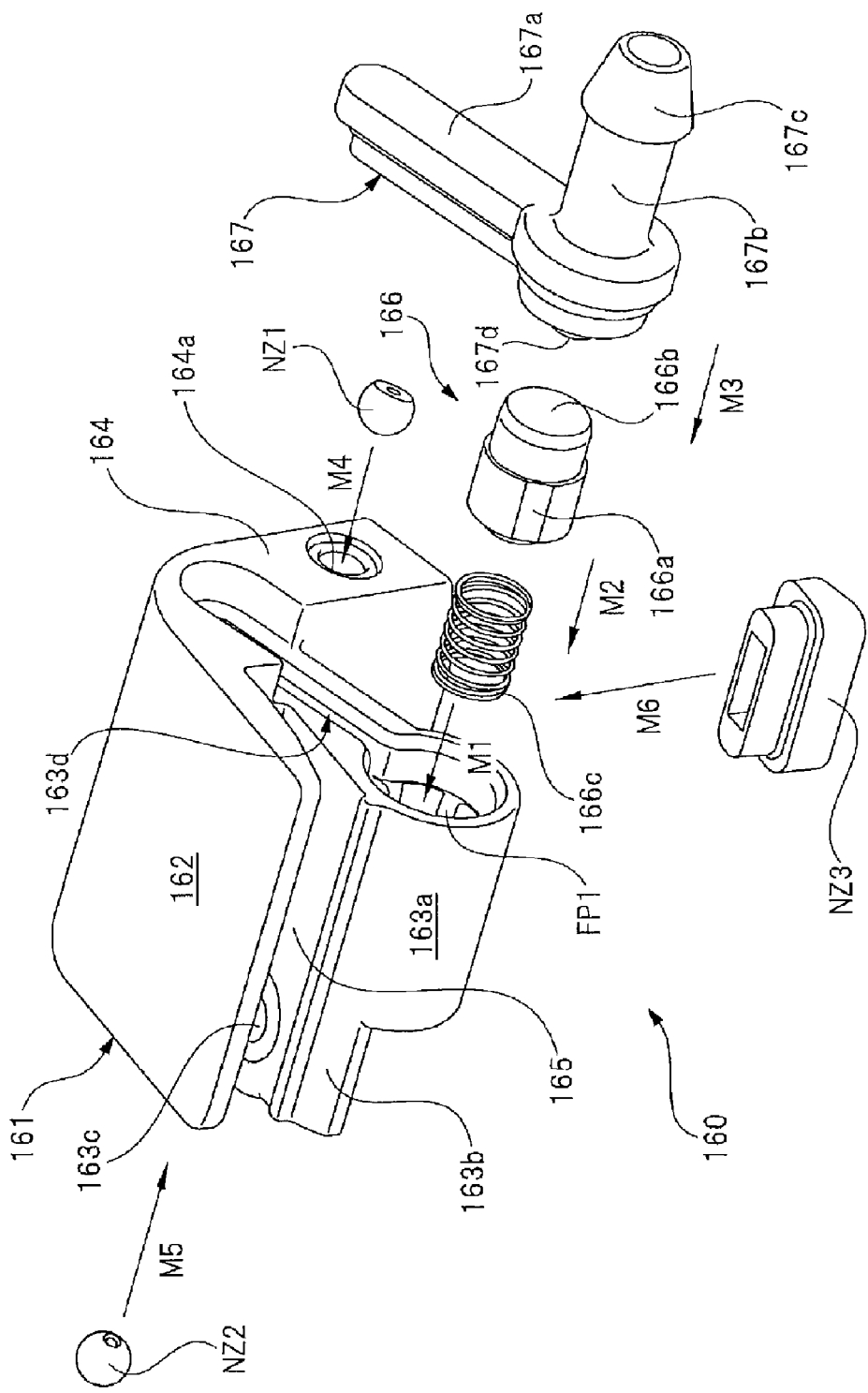
FIG. 6 is an exploded perspective view of the washer nozzle.
Figure 7:
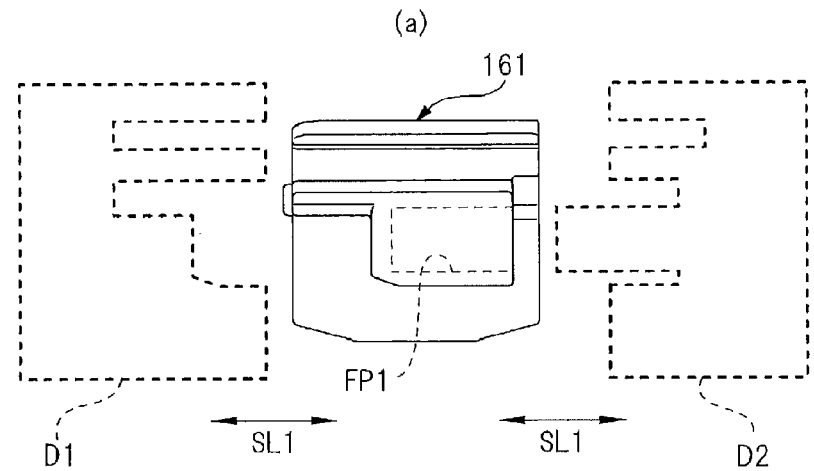
In FIG. 7, (a) and (b) are explanatory views of molds for molding a nozzle body.
Figure 7:
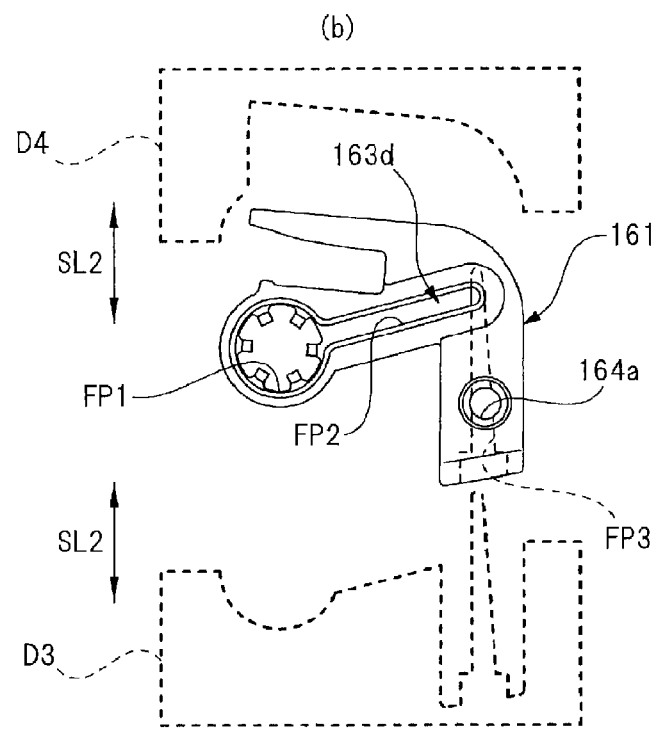

FIG. 1 is a schematic view showing a state in which a wiper device is mounted on a vehicle. FIG. 2 is a perspective view of a DR side wiper arm as viewed from the front side. FIG. 3 is a perspective view of the DR side wiper arm as viewed from the back side. In FIG. 4, (a) and (b) are perspective views showing a washer nozzle. In FIG. 5, (a) is a cross-sectional view taken along the line A-A of FIG. 2, and (b) is a cross-sectional view taken along the line B-B of (a) of FIG. 5. FIG. 6 is an exploded perspective view of the washer nozzle. In FIG. 7, (a) and (b) are explanatory views of molds for molding a nozzle body.

As shown in FIG. 1, a front windshield (surface to be wiped) 11 is provided on the front side of a vehicle 10 such as an automobile. Further, a DR side (driver seat side) wiper member 100 and an AS side (passenger seat side) wiper member 200 for wiping rainwater, dust and the like adhering to the front windshield 11 are provided on the front windshield 11.

The DR side wiper member 100 includes a DR side wiper blade 110 and a DR side wiper arm 120, and the DR side wiper blade 110 is rotatably mounted on the tip end of the DR side wiper arm 120. The AS side wiper member 200 includes an AS side wiper blade 210 and an AS side wiper arm 220, and the AS side wiper blade 210 is rotatably mounted on the tip end of the AS side wiper arm 220.

The DR side wiper blade 110 and the AS side wiper blade 210 are configured to perform a reciprocal wiping operation in the same direction in synchronization with each other in a DR side wiping range 12 and an AS side wiping range 13 formed between a lower reversing position LRP and an upper reversing position URP on the front windshield 11. That is, the wiping pattern of the DR side wiper blade 110 and the AS side wiper blade 210 is a so-called "tandem type."

A wiper device 14 that swings the DR side wiper member 100 and the AS side wiper member 200 is mounted on a portion on the front end side of the front windshield 11 in the vehicle 10 and in the vicinity of a bulkhead (not shown). The wiper device 14 includes a DR side pivot shaft 15 and an AS side pivot shaft 16 as swing shafts, and the base ends of the DR side wiper arm 120 and the AS side wiper arm 220 are firmly fixed to the tip ends of the DR side pivot shaft 15 and the AS side pivot shaft 16 by fastening nuts (not shown), respectively.

Further, one end of a DR side drive lever 17 and one end of an AS side drive lever 18 in the longitudinal direction are fixed to the base ends of the DR side pivot shaft 15 and the AS side pivot shaft 16. Further, the other ends of the DR side drive lever 17 and the AS side drive lever 18 in the longitudinal direction are rotatably connected to two ends of a connection rod 19 in the longitudinal direction via ball joints BJ, respectively.

One end of a drive rod 20 in the longitudinal direction is rotatably connected to the other end of the AS side drive lever 18 in the longitudinal direction also via the ball joint BJ. Further, the other end of the drive rod 20 in the longitudinal direction is rotatably connected to one end of a crank arm 21 in the longitudinal direction also via a ball joint BJ.

The other end of the crank arm 21 in the longitudinal direction is fixed to an output shaft 23 of a wiper motor 22, and the one end (connection portion with the drive rod 20) of the crank arm 21 in the longitudinal direction is configured to rotate with the rotation of the output shaft 23.

Here, the crank arm 21, the drive rod 20, the connection rod 19, the DR side drive lever 17, and the AS side drive lever 18 configure a "link mechanism" that converts the rotational motion of the wiper motor 22 into the swing motion of the DR side pivot shaft 15 and the AS side pivot shaft 16. In this way, the DR side pivot shaft 15 and the AS side pivot shaft 16 are driven to swing, respectively.

As a result, the DR side wiper arm 120 and the AS side wiper arm 220 swing, and the DR side wiper blade 110 and the AS side wiper blade 210 wipe the DR side wiping range 12 and the AS side wiping range 13 on the front windshield 11, respectively.

Further, a brush or brushless electric motor can be used as the wiper motor 22. However, when the wiper motor 22 is mounted on a hybrid vehicle (HV) or an electric vehicle (EV) available in recent years, from the viewpoint of quietness and the like, it is desirable to use a brushless electric motor that does not generate brush sliding noise (including electromagnetic noise).

As shown in FIGS. 2 and 3, the DR side wiper arm 120 is formed in a substantially straight linear shape, and an arm head 130, an arm shank 140 and an arm piece 150 are connected and provided in this order from the base end side (right side in FIG. 2) of the DR side wiper arm 120.

The arm head 130 is formed in a substantially rod shape by casting and molding an aluminum material or the like, thereby reducing the weight. A pivot shaft fixing part 131 in which the tip end of the DR side pivot shaft 15 (see FIG. 1) is fixed via a fastening nut (not shown) is integrally provided at base end of the arm head 130 in the longitudinal direction.

The pivot shaft fixing part 131 is formed in a substantially tubular shape, and a washer tube TB having flexibility made of silicone rubber or the like is arranged to be wound around the outer peripheral portion thereof. As a result, when the DR side wiper arm 120 swings, the washer tube TB is wound or loosened around the pivot shaft fixing part 131. Therefore, there is not a large load applied to the washer tube TB.

That is, the washer tube TB is suppressed from being elastically deformed, and a washer fluid W (see FIG. 4) can smoothly flow in the washer tube TB. Further, since the washer tube TB is suppressed from being elastically deformed, the load applied to the wiper motor 22 is also reduced. Here, in the figure, the washer tube TB is shaded in order to make the arrangement state of the washer tube TB easier to understand.

Further, a shank fixing part 132 on which the base end of the arm shank 140 in the longitudinal direction is mounted is integrally provided at the tip end of the arm head 130 in the longitudinal direction. The arm shank 140 can be locked back to the shank fixing part 132; that is, it is connected to be able to be upright with respect to the front windshield 11, and a support pin PN is mounted on the shank fixing part 132. That is, the arm shank 140 can be locked back with the support pin PN as the center.

Further, the shank fixing part 132 is provided with a hook part 132a on which a steel hook member FK is hooked. One end of a tension spring SP in the longitudinal direction is hooked on the hook member FK. Further, the other end of the tension spring SP in the longitudinal direction is hooked on a spring hook SF made of a steel material fixed to the central part of the arm shank 140 in the longitudinal direction. Then, the spring force of the tension spring SP acts to press the DR side wiper blade 110 (see FIG. 1) against the front windshield 11 with a predetermined pressure. Furthermore, the spring force of the tension spring SP also acts to hold the arm shank 140 in an upright state (lock-back state) with respect to the arm head 130.

The arm shank 140 is formed to be long by pressing a steel plate or the like. Specifically, the cross-sectional shape of the arm shank 140 along a direction (lateral direction) intersecting the longitudinal direction is formed in a substantially U shape. The arm shank 140 includes a shank top wall 141 arranged on the front side of the DR side wiper arm 120, and a pair of shank side walls 142 protruding from both sides of the shank top wall 141 in the lateral direction toward the front windshield 11. As a result, as shown in FIG. 3, the tension spring SP and the washer tube TB are housed inside the arm shank 140, and when the arm shank 140 is viewed from the side, the tension spring SP and the washer tube TB are hidden by the pair of shank side walls 142.

Further, a pair of head fixing parts 143 (see FIG. 2) are integrally provided at the base end of the arm shank 140 in the longitudinal direction to protrude in the longitudinal direction of the arm shank 140. These head fixing parts 143 are provided to sandwich the shank fixing part 132 of the arm head 130 from the side, and are connected to the shank fixing part 132 by the support pin PN. That is, the base end of the arm shank 140 is mounted on the tip end of the arm head 130.

Further, a piece fixing part 144 to which the base end of the arm piece 150 in the longitudinal direction is fixed is integrally provided at the tip end of the arm shank 140 in the longitudinal direction. Specifically, the base end of the arm piece 150 in the longitudinal direction is fixed to the tip end of the arm shank 140 in the longitudinal direction by crimping the piece fixing part 144. As a result, the piece fixing part 144 wraps the base end of the arm piece 150 in the longitudinal direction. In this way, the base end of the arm piece 150 is mounted on the tip end of the arm shank 140.

Further, the spring hook SF is fixed in the vicinity of the piece fixing part 144 of the arm shank 140 and between the pair of shank side walls 142. Then, as shown in FIGS. 2 and 3, the washer tube TB housed inside the arm shank 140 is pulled out to the outside of the arm shank 140 at the portion of the piece fixing part 144. The washer tube TB pulled out to the outside of the arm shank 140 is arranged straight along the piece fixing part 144 without loosening. Therefore, the appearance of the DR side wiper arm 120 is not compromised in this portion.

The arm piece 150 is formed into a substantially straight flat plate shape by pressing a steel plate or the like. Here, the thickness of the arm piece 150 is thicker than the thickness of the arm shank 140. As a result, even for the flat plate-shaped arm piece 150, sufficient rigidity can be obtained as in the arm shank 140, and therefore, the DR side wiper arm 120 is prevented from bending.

A U-shaped hook 151 on which the DR side wiper blade 110 is mounted is integrally provided at the tip end of the arm piece 150 in the longitudinal direction. A connection member (not shown) provided at the central part of the DR side wiper blade 110 in the longitudinal direction is fixed to the U-shaped hook 151 with one touch. Further, the connection member provided at the central part of the DR side wiper blade 110 in the longitudinal direction is swingable with respect to the DR side wiper blade 110. Therefore, the DR side wiper blade 110 mounted on the arm piece 150 is swingable with respect to the DR side wiper arm 120.

Further, a washer nozzle 160 for spraying the washer fluid W (see FIG. 4) toward the front windshield 11 is mounted on a portion of the arm piece 150 near the U-shaped hook 151 along the longitudinal direction. The tip end of the washer tube TB in the longitudinal direction is connected to the washer nozzle 160. Here, the washer tube TB arranged between the piece fixing part 144 and the washer nozzle 160 is arranged along the arm piece 150 without loosening. In this way, the washer tube TB is arranged along the arm head 130, the arm shank 140 and the arm piece 150.

Here, the base end of the washer tube TB in the longitudinal direction is connected to a washer device (not shown) installed in the engine room or the like of the vehicle 10. This washer device includes a washer tank for storing the washer fluid W and a washer pump mounted on the washer tank. Then, the washer pump is operated by operating a washer switch (not shown) provided in the vehicle interior. As a result, the washer fluid W in the washer tank is sent out to the washer tube TB and then well sprayed from the washer nozzle 160 toward the front windshield 11 (see FIG. 4).

As shown in FIGS. 4 to 7, the washer nozzle 160 includes a nozzle body 161. The nozzle body 161 is formed into a predetermined shape by injection molding a resin material such as plastic. Specifically, as shown in (a) of FIG. 5, the nozzle body 161 includes a first wall 162, a second wall 163, and a third wall 164. Further, the base ends of the first wall 162 and the third wall 164 are connected to each other to be substantially at right angles to each other, and the base end of the second wall 163 is connected between the first wall 162 and the third wall 164.

An arm piece mounting groove 165 in which the arm piece 150 is mounted is formed between the first wall 162 and the second wall 163. The depth dimension DP of the arm piece mounting groove 165 is greater than the width dimension WL of the arm piece 150 (DP>WL). Further, the width dimension WP of the arm piece mounting groove 165 is slightly less than the thickness dimension TN of the arm piece 150 (WP<TN). As a result, the arm piece 150 is firmly fixed to the arm piece mounting groove 165 without protruding or rattling.

As shown in FIG. 4, the second wall 163 includes a valve housing part 163a and a flat plate part 163b. As shown in FIGS. 5 and 6, the valve housing part 163a is formed in a bottomed tubular shape, and a first flow path FP1 which extends in the longitudinal direction of the arm piece 150 and through which the washer fluid W flows is formed inside the valve housing part 163a. Further, a check valve mechanism 166 is housed inside the valve housing part 163a.

The check valve mechanism 166 allows only the flow of the washer fluid W from the upstream side (washer pump side) to the downstream side (front windshield 11 side). As a result, the washer fluid W can be stopped (stored) inside the washer tube TB (see FIG. 3) arranged between the washer pump and the washer nozzle 160. Therefore, at the next spraying of the washer fluid W, the washer fluid W can be quickly sprayed onto the front windshield 11 as the washer pump operates.

Here, as shown in (b) of FIG. 5 and FIG. 6, the check valve mechanism 166 includes a movable body 166a made of plastic, a valve body 166b made of rubber and mounted on the tip end of the movable body 166a, and a valve spring 166c that presses the base end side of the movable body 166a toward a closing member 167. Further, the valve body 166b is configured to detach and seat on a valve seat 167d provided on the closing member 167. As a result, by driving the washer pump, the pressure of the washer fluid W on the upstream side of the valve body 166b increases, and as a result, the valve body 166b opens.

Further, the flat plate part 163b is formed in a substantially flat plate shape, and a screw hole 163c is provided on the U-shaped hook 151 side (left side in (a) of FIG. 4) of the flat plate part 163b. The screw hole 163c penetrates the flat plate part 163b in the plate thickness direction, and a fixing screw S (see FIG. 3) is inserted into the screw hole 163c. That is, the flat plate part 163b is fixed to the arm piece 150 by the fixing screw S.

In addition, a second flow path FP2 which extends in a direction (lateral direction) intersecting the longitudinal direction of the arm piece 150 is provided inside the flat plate part 163b on the arm shank 140 side (front side in (b) of FIG. 4). More specifically, the second flow path FP2 formed inside the flat plate part 163b is connected to the downstream side of the first flow path FP1 formed inside the valve housing part 163a, and as shown in (b) of FIG. 5, the valve body 166b is pushed open, and the flow direction of the washer fluid W that has flown out of the first flow path FP1 is changed to a right angle (90°) direction toward the lateral direction of the arm piece 150. Then, the washer fluid W flowing through the second flow path FP2 is guided to the third flow path FP3 formed inside the third wall 164. That is, the two ends of the second flow path FP2 are connected to the first flow path FP1 and the third flow path FP3, respectively.

Further, a lid 167a of the closing member 167 is mounted to the second wall 163 on the arm shank 140 side. Here, as shown in (b) of FIG. 5, the valve housing part 163a and the flat plate part 163b are greatly opened on the arm shank 140 side (lower side in the figure). Specifically, the first flow path FP1 and the second flow path FP2 communicate with each other, and these first and second flow paths FP1 and FP2 are both opened on one side in the longitudinal direction of the arm piece 150 (the arm shank 140 side). The openings of the first and second flow paths FP1 and FP2 become a common upstream opening (flow path opening) 163d, and the upstream opening 163d is sealed by the closing member 167. Further, the closing member 167 is formed into a predetermined shape by injection molding a resin material such as plastic like the nozzle body 161 and is fixed to the nozzle body 161 by an adhesive method such as ultrasonic welding.

As shown in FIGS. 4 to 6, the closing member 167 includes the lid 167a in a long, narrow, substantially rod shape and a joint part 167b integrally provided with the lid 167a. The lid 167a seals the upstream opening 163d, whereby the washer fluid W flowing through the first flow path FP1 and the second flow path FP2 is prevented from leaking to the outside.

Further, the joint part 167b is formed in a hollow cylindrical shape and extends in a direction orthogonal to the lid 167a. In addition, the tip end of the washer tube TB in the longitudinal direction is connected to the tip end (lower side in (b) of FIG. 5) of the joint part 167b in the longitudinal direction (see FIGS. 2 and 3). Further, the tip end of the joint part 167b in the longitudinal direction is integrally provided with an annular retaining protrusion 167c that functions as a retaining part for the washer tube TB.

Further, an upstream flow path UFP through which the washer fluid W flows is formed inside the joint part 167b, and this upstream flow path UFP is communicated with the first flow path FP1 via the check valve mechanism 166. Further, the valve seat 167d in the annular shape on which the valve body 166b of the check valve mechanism 166 detaches and seats is integrally provided at the base end (upper side in (b) of FIG. 5) of the joint part 167b in the longitudinal direction. The valve seat 167d protrudes from the lid 167a at a minute height, and the tip end thereof is in contact with the valve body 166b.

As shown in FIG. 4, the third wall 164 occupies a relatively large portion of the nozzle body 161. The third wall 164 is formed in a substantially box shape, and as shown in FIG. 5, a third flow path FP3 through which the washer fluid W from the second flow path FP2 flows is formed inside the third wall 164. That is, the third flow path FP3 is connected to the downstream side of the second flow path FP2, and the third flow path FP3 extends toward the front windshield 11. Further, as shown in FIG. 5, the third flow path FP3 is arranged on a side of the second flow path FP2 opposite to the first flow path FP1 side.

The upstream side of the third flow path FP3 (second flow path FP2 side) is narrower than the downstream side of the third flow path FP3 (first, second and third nozzle bodies NZ1, NZ2 and NZ3 side). As a result, a third slide mold D3 (see (b) of FIG. 7) that forms the third flow path FP3 can be easily released.

As shown in FIGS. 4 and 5, a pair of first downstream opening 164a and second downstream opening 164b opened in the longitudinal direction of the arm piece 150 are provided on the downstream side (front windshield 11 side) of the third flow path FP3. Further, a first nozzle body NZ1 in a substantially spherical shape provided with a first spraying hole IA for spraying the washer fluid W is mounted in the first downstream opening 164a. Further, a second nozzle body NZ2 in a substantially spherical shape provided with a second spraying hole D3 for spraying the washer fluid W is mounted in the second downstream opening 164b.

Further, a third downstream opening 164c opened in the lateral direction of the arm piece 150 is provided on the downstream side of the third flow path FP3. A third nozzle body NZ3, which is formed in a substantially box shape and which is provided with three spraying holes including a third spraying hole IC, a fourth spraying hole ID and a fifth spraying hole IE, is mounted in the third downstream opening 164c.

Here, the first and second nozzle bodies NZ1 and NZ2 are mounted rotatably with respect to the third wall 164. In this way, the spraying position of the washer fluid W sprayed from the first and second spraying holes IA and D3 with respect to the front windshield 11 can be adjusted. On the other hand, in the third, fourth and fifth spraying holes IC, ID and IE of the third nozzle body NZ3, the spraying positions cannot be adjusted. However, depending on the required specifications, a nozzle body in a substantially spherical shape capable of adjusting the spraying position, similar to the first and second nozzle bodies NZ1 and NZ2, may be used instead of the third nozzle body NZ3.

As a result, by operating the washer switch to operate the washer pump, the washer fluid W flows through the washer tube TB and the upstream flow path UFP as shown by the broken line arrows in FIGS. 4 and 5, and makes the check valve mechanism 166 open. The washer fluid W that pushes open the check valve mechanism 166 then flows through the first flow path FP1, the second flow path FP2 and the third flow path FP3, and is sprayed from a total of five spraying holes, including the first, second, third, fourth and fifth spraying holes IA, IB, IC, ID and IE, respectively.

Next, the procedure for assembling the washer nozzle 160 formed as described above will be described in detail with reference to FIG. 6.

First, as shown by the arrow M1 in FIG. 6, the valve spring 166c that forms the check valve mechanism 166 is inserted into the valve housing part 163a. After that, as shown by the arrow M2 in FIG. 6, the movable body 166a and the valve body 166b that form the check valve mechanism 166 are inserted into the valve housing part 163a. At this time, the movable body 166a and the valve body 166b have been assembled to each other in advance, and the movable body 166a side is directed toward the valve spring 166c. In this way, the housing of the check valve mechanism 166 in the valve housing part 163a is completed.

Next, as shown by the arrow M3 in FIG. 6, the work of closing the upstream opening 163d of the nozzle body 161 with the closing member 167 is performed. At this time, the valve seat 167d side of the closing member 167 is directed toward the check valve mechanism 166 side. That is, the joint part 167b side of the closing member 167 is directed to the side opposite to the check valve mechanism 166 side. Next, the closing member 167 is welded to the nozzle body 161 by using an ultrasonic welding machine (not shown). As a result, the valve body 166b is seated on the valve seat 167d and the upstream opening 163d is sealed, and the work of fixing the closing member 167 to the nozzle body 161 is completed.

Next, the first, second and third nozzle bodies NZ1, NZ2 and NZ3 are prepared. Then, as shown by the arrow M4 in FIG. 6, the first nozzle body NZ1 is mounted to the first downstream opening 164a. At this time, the first nozzle body NZ1 is pressed with a relatively large force to be fitted into the first downstream opening 164a. Further, as shown by the arrow M5 in FIG. 6, the second nozzle body NZ2 is mounted to the second downstream opening 164b (see (a) of FIG. 4). At this time, the second nozzle body NZ2 is pressed with a relatively large force to be fitted into the second downstream opening 164b.

Further, as shown by the arrow M6 in FIG. 6, the third nozzle body NZ3 is fitted into the third downstream opening 164c (see (a) of FIG. 5) of the nozzle body 161. Then, similar to the closing member 167, the third nozzle body NZ3 is welded to the nozzle body 161 by using an ultrasonic welding machine. In this way, the assembly of the washer nozzle 160 is completed.

Here, as shown in FIG. 7, the nozzle body 161 has a shape that can be easily molded by a total of four slide molds (shown in a schematic shape). That is, as shown by the arrow SL1 in (a) of FIG. 7, the nozzle body 161 can be molded by a first slide mold (left mold) D1 and a second slide mold (right mold) D2 that can move in the longitudinal direction of the nozzle body 161 (arm piece 150), and, as shown by the arrow SL2 in (b) of FIG. 7, by a third slide mold (lower mold) D3 and a fourth slide mold (upper mold) D4 that can move in the lateral direction of the nozzle body 161 (arm piece 150).

However, it is not necessary to make both the first slide mold D1 and the second slide mold D2 slidable, and one of the first and second slide molds D1 and D2 may be a "fixed mold." Further, it is not necessary to make both the third slide mold D3 and the fourth slide mold D4 slidable, and one of the third and fourth slide molds D3 and D4 may be a "fixed mold."

Then, in the case of focusing on an opening or a hole formed in the nozzle body 161, the first slide mold D1 is configured to form the second downstream opening 164b (see (a) of FIG. 4). Further, the second slide mold D2 is configured to form the first downstream opening 164a, the first flow path FP1 and the second flow path FP2. Further, the third slide mold D3 is configured to form the screw hole 163c (see (a) of FIG. 4) and the third flow path FP3.

As described above, the nozzle body 161 can be molded simply by molds that move in two directions including the left-right direction and the up-down direction. This is because the first flow path FP1 extending in the longitudinal direction of the nozzle body 161 and the second flow path FP2 extending in the lateral direction of the nozzle body 161 are opened by a common upstream opening 163d facing the arm shank 140 side of the nozzle body 161.

More specifically, in the embodiment, among the first flow path FP1, the second flow path FP2 and the third flow path FP3 that extend in three directions, two flow paths—the first flow path FP1 and the second flow path FP2—can be molded with one second slide mold D2. As a result, it is not required to prepare another mold for forming the second flow path FP2 whose extending direction is different from that of the first flow path FP1.

Further, if the second flow path FP2 is molded by another mold that moves in the same direction as the extending direction thereof, it becomes necessary to close the portion of a hole through which the mold passes when molding the second flow path FP2 with another closing member prepared separately. However, in the embodiment, it is sufficient to close the upstream opening 163d with only one closing member 167. Therefore, in the embodiment, it is not required to prepare another closing member, and the number of parts can thus be reduced, and small parts management and the like are not required, and the yield can be improved.

Here, in the embodiment, the closing member 167 has a relatively large shape, and the first and second flow paths FP1 and FP2 can be formed simply by one closing member 167; that is, only one closing work is required, and there is no need to manage small parts. In other words, there is an advantage that the closing member 167 can be easily managed and the yield can be improved. Further, since the closing member 167 is relatively large, an adhesive method such as ultrasonic welding as described above can be adopted. Therefore, it is possible to reliably prevent the washer fluid W from leaking to the outside for a long period of time.

As described in detail above, according to the embodiment, the washer nozzle 160 includes the first flow path FP1 which extends in the longitudinal direction of the arm piece 150, the second flow path FP2 which is connected to the downstream side of the first flow path FP1 and which extends in a direction intersecting the longitudinal direction of the arm piece 150, the upstream opening 163d which opens the first flow path FP1 and the second flow path FP2 toward one side in the longitudinal direction of the arm piece 150, and the closing member 167 which is provided with the joint part 167b connected with the washer tube TB and which closes the upstream opening 163d.

As a result, both the first flow path FP1 and the second flow path FP2, which are in a mutually intersecting relationship, can be opened in the same direction on one side in the longitudinal direction of the arm piece 150, and thus the first flow path FP1 and the second flow path FP2 can be molded by using one mold, specifically, the second slide mold D2 (see (a) of FIG. 7). Further, since the upstream opening 163d can be closed with the relatively large closing member 167 which has the joint part 167b, as compared with the conventional case, small parts management is not required, and thus the assembly workability can be improved.

Further, according to the embodiment, the washer nozzle 160 includes the third flow path FP3 which is connected to the downstream side of the second flow path FP2 and which extends toward the front windshield 11. Therefore, the first, second and third nozzle bodies NZ1, NZ2 and NZ3 can be brought close to the front windshield 11. Therefore, it is possible to reliably spray the washer fluid W to predetermined positions on the front windshield 11.

Further, according to the embodiment, the washer nozzle 160 includes the flat plate part 163b inside which the second flow path FP2 is provided and which is fixed to the arm piece 150 by the fixing screw S. Therefore, the washer nozzle 160 can be firmly fixed to the arm piece 150 without rattling. Therefore, it is possible to reliably prevent the spraying position of the washer nozzle 160 from shifting for a long period of time.

The disclosure is not limited to the above embodiment, and various modifications may be made without departing from the spirit of the disclosure. For example, in the above embodiment, the DR side wiper arm 120 is provided with the washer nozzle 160, but the disclosure is not limited thereto, and the AS side wiper arm 220 may be provided with the washer nozzle 160 (see FIG. 1).

Further, in the above embodiment, the DR side wiper arm 120 is used in the vehicle 10 such as an automobile, but the disclosure is not limited thereto, and for example, it may be used in an aircraft, a railroad vehicle, a construction machine and the like.

In addition, the material, shape, dimension, number, installation location and the like of each component in the above embodiment may be set as desired as long as the disclosure can be achieved, and they are not limited to the above embodiment.

What is claimed is:

1. A wiper arm which swings a wiper blade that wipes a surface to be wiped, the wiper arm comprising:
    an arm head whose base end is mounted on a swing shaft;
    an arm shank whose base end is mounted on a tip end of the arm head;
    an arm piece whose base end is mounted on a tip end of the arm shank;
    a washer tube which is arranged along the arm head, the arm shank and the arm piece; and
    a washer nozzle which is mounted on the arm piece and which sprays a washer fluid toward the surface to be wiped,
    wherein the washer nozzle comprises:
    a check valve;
    a valve housing inside which the check valve is housed;
    a first flow path which extends in a longitudinal direction of the arm piece and is formed inside the valve housing;
    a second flow path which is connected to a downstream side of the first flow path and which extends in a direction intersecting the longitudinal direction of the arm piece;
    a flow path opening which opens the first flow path and the second flow path toward one side in the longitudinal direction of the arm piece; and
    a closing member which is provided with a joint part connected with the washer tube and is provided with a valve seat at a base side of the joint part in a longitudinal direction of the joint part for contacting the check valve to close which closes the flow path opening.

2. The wiper arm according to claim 1, wherein the washer nozzle further comprises:
    a third flow path which is connected to a downstream side of the second flow path and which extends toward the surface to be wiped.

3. The wiper arm according to claim 1, wherein the washer nozzle further comprises:
    a flat plate part inside which the second flow path is provided and which is fixed to the arm piece by a fixing screw.

* * * * *